No. 727,640. PATENTED MAY 12, 1903.
E. J. KING.
ELECTRIC METER.
APPLICATION FILED OCT. 11, 1901.
NO MODEL
2 SHEETS—SHEET 1.

Witnesses.
John Ellis Glenn
Benjamin B. Hull

Inventor.
Elton J. King.
by 
Atty.

THE NORRIS PETERS CO., PHOTO-LITHO., WASHINGTON, D. C.

No. 727,640. PATENTED MAY 12, 1903.
E. J. KING.
ELECTRIC METER.
APPLICATION FILED OCT. 11, 1901.
NO MODEL. 2 SHEETS—SHEET 2.
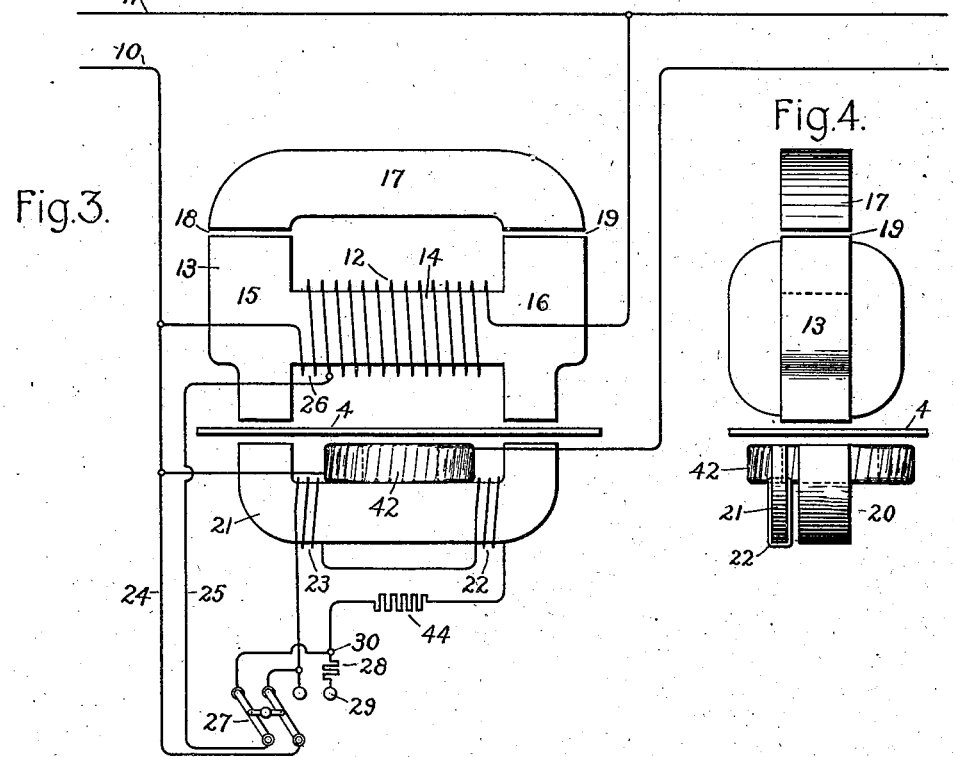
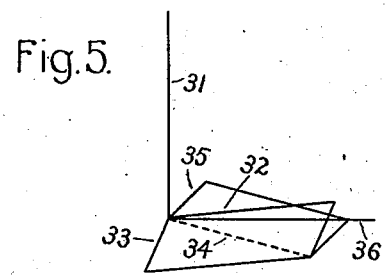
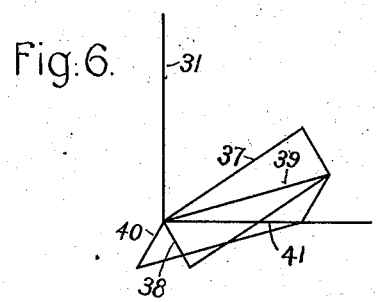
Witnesses.
Inventor:
Elton J. King.
by Atty.

No. 727,640.

Patented May 12, 1903.

UNITED STATES PATENT OFFICE.

ELTON J. KING, OF FORT WAYNE, INDIANA, ASSIGNOR TO GENERAL ELECTRIC COMPANY, A CORPORATION OF NEW YORK.

ELECTRIC METER.

SPECIFICATION forming part of Letters Patent No. 727,640, dated May 12, 1903.

Application filed October 11, 1901. Serial No. 78,293. (No model.)

*To all whom it may concern:*

Be it known that I, ELTON J. KING, a citizen of the United States, residing at Fort Wayne, county of Allen, State of Indiana, have invented certain new and useful Improvements in Electric Meters, of which the following is a specification.

My present invention relates to electric meters, and particularly those of the induction type suitable for measuring alternating currents, either single phase or multiphase.

My invention is in this case embodied in a single-phase integrating induction-wattmeter; but it will be evident that various features of the invention may be usefully applied otherwise than in a meter of this particular character.

One of the objects of my invention is the production of a meter of cheap construction which will be capable of giving accurate and reliable results on alternating - current circuits regardless of the power factor and which can be adapted to circuits of different frequencies without reconstruction.

The features of novelty which characterize my invention are pointed out in the appended claims, the construction and mode of operation of a meter embodying these features of novelty being set forth in detail in the following description, which is to be taken in connection with the accompanying drawings, in which—

Figure 1:
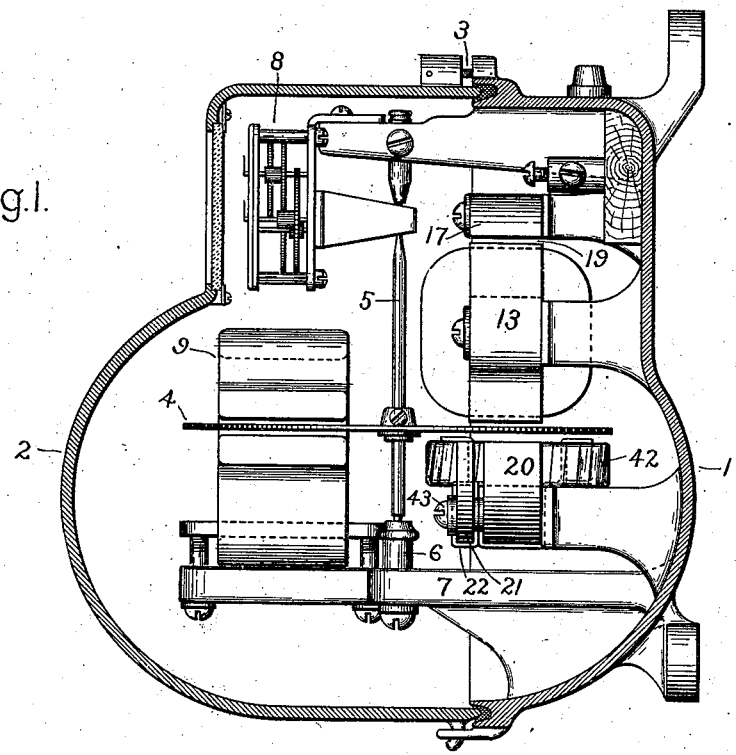
Figure 2:
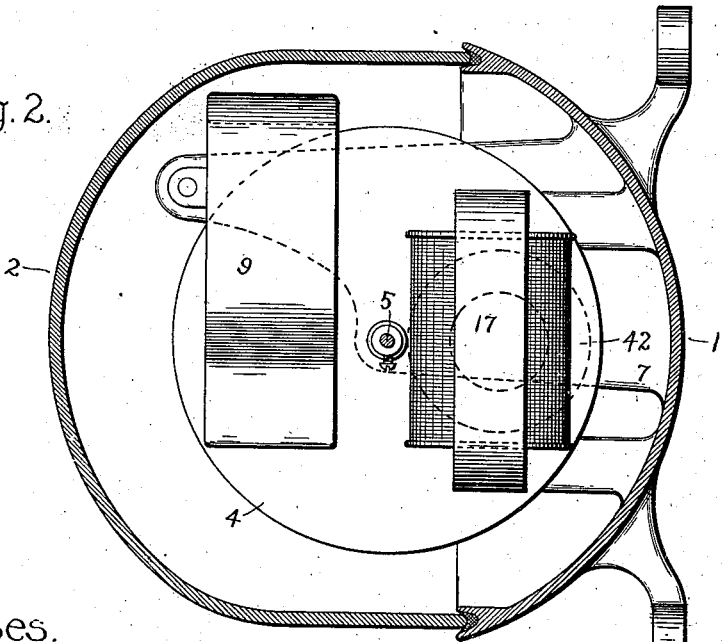
Figure 2:

Figure 1 is a side elevation of the meter with the casing partially broken away. Fig. 2 is a plan view of the interior of the meter with the casing partially broken away and the counter or registering device removed. Figs. 3 and 4 are representations, partly structural and partly diagrammatic, of the magnetic and electrical circuits of the meter; and Figs. 5 and 6 are diagrams of the phase relations of various quantities involved in the operation of the meter.

As a support for the working parts of the meter hereinafter to be described, I make use of a casing somewhat globular in form, (represented at 1.) This casing is made in two parts, the part 2 having its lower end joined to the part 1 and its upper end secured in position by some mechanical device, such as a screw 3. The rotating member of the meter is of usual construction and comprises a disk 4, preferably of aluminium, carried by a vertical shaft 5, the lower end of which is pivoted in a jewel or other bearing 6, fixed to a lug or projection 7, extending from and forming an integral part of the casing 1. The revolutions of this shaft are registered in the usual manner by a counter or recording device 8, supported from the casing 1. The rotating disk 4 being set into motion by electromagnetic means hereinafter to be described is acted upon by a damping-magnet 9, which in a well-understood manner opposes the rotation of the disk with a force proportional to the speed of rotation.

The meter - driving mechanism above referred to, although indicated in outline in Figs. 1 and 2, will perhaps be best understood by referring now to Figs. 3 and 4. In these figures the supply - mains carrying the current to be measured are represented at 10 and 11. Across these mains is connected a coil 12, forming the shunt-circuit of the meter. This coil is mounted upon an iron core so arranged that the flux passing through the coil divides into two portions or branches, one portion, which is comparatively small with respect to the total flux, passing through the rotating disk of the member, the other portion passing through a magnetic shunt of low reluctance and separated from the core upon which the said coil is wound by a small air gap or gaps, the reluctance of which is very considerably less than that met with by the smaller portion of the flux threading through the rotating disk.

A particular arrangement of the magnetic circuit employed is shown in side view in Fig. 3 and comprises a bunch of stampings 13, having a long body portion 14 and end pieces 15 16. Across the upper ends of these end pieces is mounted a laminated keeper or return circuit 17, separated from the ends by small air-gaps 18 and 19. The lower ends of the end pieces are mounted over the rotating disk 4, and their magnetic circuit is completed through two U - shaped laminated structures 20 and 21.

By reason of the nearly - closed magnetic circuit through the keeper 17 and the consequently low magnetic reluctance the inductance of the coil 12 is very high, thereby causing the current supplied thereto from the shunt connection across the mains 10 and 11 to lag nearly ninety degrees behind the impressed electromotive force. The flux which is caused to thread the disk 4 by the action of the coil 12 therefore lags in the same way nearly ninety degrees behind the impressed electromotive force. This flux, however, sets up eddy or secondary currents in the disk 4, the effect of which is to produce a resultant flux having a greater angular displacement from the electromotive force than that due to the action of the shunt-coil 12 alone. With high-frequency current—such, for example, as one hundred and twenty-five cycles—it may happen that this angular displacement attains a magnitude greater than ninety degrees. Since it is necessary, for reasons well understood in the art, that the angular displacements should be ninety degrees, I provide means whereby a compensating magnetomotive force may be impressed upon the magnetic system, so as to bring back the phase displacement to ninety degrees. In the present instance this compensating magnetomotive force is derived from a circuit supplied from the mains 10 11 with a reduced electromotive force. This circuit conveys current to compensating coils 22 and 23, mounted upon the supplementary laminated magnetic return 21. The circuit referred to might be supplied with current from the mains through a separate step-down transformer or compensator; but I avoid this unnecessary apparatus by utilizing the shunt-coil 12 as a step-down compensator. To this end the compensating circuit represented by the leads 24 and 25 is connected across a small portion 26 of the winding 12.

To adjust the magnitude, as well as phase, of the current in the compensating circuit thus supplied, I may make use of a resistance 44. The compensating coils 22 and 23 being provided with current in the manner described are connected so that the magnetomotive force due thereto acts more or less in opposition to that due to the induced currents of the disk 4. By proper adjustment by means already described an exact ninety-degree relation may be secured.

In case current of lower frequency is to be measured by the meter a readjustment of the parts is necessary to secure a proper ninety-degree relation when supplied with current of this new frequency. With current of low frequency it is obvious that the angle of lag of current in the shunt-circuit of the meter will be less than with higher frequency, and it may be so much less that the reactive or induced currents in the disk or rotating member of the meter is insufficient to bring the resulting flux up to a ninety-degree displacement. To provide for this contingency, I place a reversing-switch 27 in the leads 24 and 25, whereby the action of the compensating coils 22 and 23 is reversed in direction and tends to increase the resultant phase displacement rather than decrease it. In general the amount of current in the compensating circuit sufficient to produce a ninety-degree relation with high-frequency current is different from that necessary to produce the same phase relation with low-frequency current. In order to produce the proper adjustment of current at the same time the compensating circuit is reversed for the purpose of adjusting the meter to a new frequency, I arrange the reversing-switch 27 so that simultaneously with the reversal the resistance of the compensating circuit is changed. This end is accomplished by inserting a resistance 28 between one of the fixed contacts 29 of the reversing-switch and the point of connection 30 of another of the fixed contacts. By this arrangement, as illustrated, the reversing-switch in one position includes the resistance in circuit and in the other position leaves it out.

The phase relations briefly referred to above may perhaps be better understood by inspection of the diagrams designated in Figs. 5 and 6. Fig. 5 represents the conditions existing when high-frequency current is supplied to the meter. In this figure the line 31 indicates the phase of the impressed electromotive force. The line 32 represents in magnitude and phase the magnetomotive force impressed by the shunt-field on the magnetic circuit threading through the rotating member of the meter. The line 33 similarly represents the effect of induced currents in the rotating member of the meter. The dotted line 34 represents the resultant flux which would be produced were no employment made of a compensating means such as described above. It will be noticed that this line represents a phase displacement greater than ninety degrees from the impressed electromotive force. To bring the resultant back to ninety degrees, a magnetomotive force is impressed upon the system in a direction tending to reduce the lag. This compensating magnetomotive force is represented at 35 and combines with the magnetomotive force 34 to produce the resultant 36 displaced exactly ninety degrees from the impressed electromotive force.

In Fig. 6, which represents the conditions when the meter is supplied with low-frequency current, the line 31 corresponds, as before, to the phase of the impressed electromotive force. The line 37 represents in magnitude and phase the magneto motive force due to the shunt exciting-circuit and, as will be seen, lags less with low-frequency current than is the case with high-frequency current, as shown in Fig. 5. The line 38 similarly represents the effect of induced currents in the rotating member of the meter. The effect of these currents is to bring the phase displacement of the resultant flux 39 nearer to ninety degrees; but with the low-frequency current employed this effect may be insufficient to bring the resultant flux exactly up to ninety degrees. To secure the additional displacement, a compensating magneto motive force 40, produced by the compensating coils, is employed. By means of the reversing-switch heretofore referred to this magnetomotive force is caused to act in a direction the reverse from that indicated in Fig. 5 and at the same time is adjusted in magnitude by means of the supplementary resistance 28, so that combined with the magneto motive force 39 it brings the resultant flux into the ninety-degree-displacement position represented by the line 41.

In the above description I have set forth in detail the nature of the shunt exciting-circuit of the induction-meter. To make the meter register the watts expended, a coil, such as the coil 42, (shown in Figs. 1 to 4,) is connected in series with one of the mains—as, for example, the main 10—and in the arrangement indicated is located under the disk 4, so that the flux due to current therein coöperates with the flux due to the shunt-circuit of the meter to produce rotation of the disk 4 at a rate proportional to the energy expended in the circuit to which the meter is connected.

The compensating coils upon the supplementary core 21 perform a function in addition to that indicated. Acting upon the flux impressed upon the supplementary core by the shunt-coil 12, they produce a phase displacement between the flux in the supplemental return 21 and the main return 20. This phase displacement tends to produce rotation of the rotating member of the meter, and by adjusting its magnitude it may be made just sufficient to balance either wholly or entirely the starting-friction of the meter. The desired adjustment is obtained by moving the core 21 toward or away from the core 20, this effect being secured by any suitable mechanical means, such as the screw 43 in Fig. 1.

What I claim as new, and desire to secure by Letters Patent of the United States, is—

1. In an induction-meter, the combination of branch magnetic circuits excited by the shunt-circuit of the meter, a gap or gaps in one of the branch magnetic circuits, a rotating member for the meter arranged to be acted upon by flux in said gap or gaps, and means for either advancing or retarding the phase of the flux in said gap or gaps.

2. In an induction-meter, the combination of branch magnetic circuits excited by the shunt-circuit of the meter, a gap or gaps in one of the branch magnetic circuits, a rotating member for the meter arranged to be acted upon by flux in said gap or gaps, and means for impressing upon the flux traversing said gap or gaps an adjustable and reversible compensating magnetomotive force.

3. In an induction electric meter, the combination of a shunt-coil, a rotating member, means for impressing upon the rotating member a portion only of the magnetic flux generated by the shunt-coil, and means for modifying the phase of the flux impressed upon the rotating member consisting of a coil or coils shunted across a portion of the length of the shunt-coil.

4. In an electric meter, the combination of a phase-adjusting winding or coil, means for impressing an electromotive force upon said winding or coil, and a reversing-switch in the leads extending to said winding or coil.

5. In an electric meter, the combination of a phase-adjusting winding, a reversing-switch in leads extending to said winding, and a resistance arranged to be cut into circuit when the reversing-switch is in one position and out of circuit when the reversing-switch is in its other position.

6. In an electric meter, the combination of a shunt-coil mounted upon a laminated core each end of which is provided with two laterally-extending projections, a return magnetic circuit for carrying the major portion of the flux generated by the shunt-coil, and another return magnetic circuit formed of separate members of magnetic material, and a phase-adjusting coil mounted upon one of said members.

7. In an electric meter, the combination with a phase-adjusting coil, of means for simultaneously reversing the direction of current in said coil and changing the resistance in the circuit of said coil.

8. In an electric meter, the combination of a rotating member, a shunt exciting-coil, means for causing a portion of the flux generated by current in said coil to flow in a magnetic circuit closed upon itself, means for causing another portion of the flux generated by current in said coil to thread into or through said rotating member, and means for modifying the phase of the last-mentioned flux by a coil or coils, the current in which can be reversed or varied at will.

9. In an electric meter, the combination of a shunt-coil mounted upon a laminated core, a return magnetic circuit for carrying the major portion of the flux generated by the shunt-coil, and another return magnetic circuit formed of separate relatively adjustable members of magnetic material.

10. In an electric meter, the combination of a laminated core, a coil mounted upon said core, means for causing a portion of the flux generated by current in said coil to flow in a magnetic circuit closed upon itself, a rotating member for the meter, and means for causing another portion of the flux generated by current in said coil to thread into or through said rotating member, said means consisting of relatively adjustable bodies of magnetic material.

In witness whereof I have hereunto set my hand this 3d day of October, 1901.

ELTON J. KING.

Witnesses:
D. C. DAVIS,
E. F. DALMAN.